UNITED STATES PATENT OFFICE.

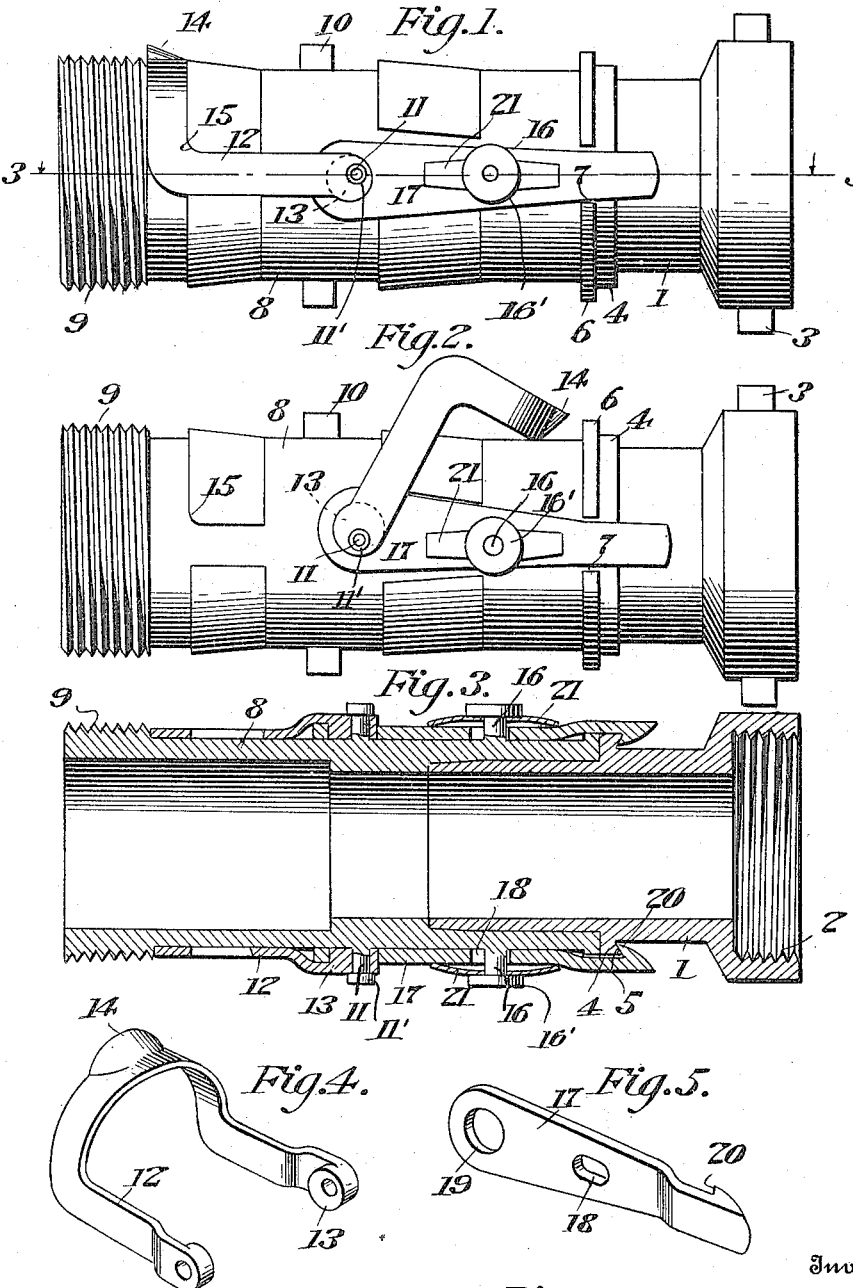

PINKNEY A. McSWAIN, OF ANDERSON, SOUTH CAROLINA.

HOSE-COUPLING.

1,220,868.  Specification of Letters Patent.  Patented Mar. 27, 1917.

Application filed January 29, 1916. Serial No. 75,077.

*To all whom it may concern:*

Be it known that I, PINKNEY A. MC-SWAIN, a citizen of the United States, residing at Anderson, in the county of Anderson and State of South Carolina, have invented new and useful Improvements in Hose-Couplings, of which the following is a specification.

This invention relates to hose coupling and it consists in the novel features thereinafter described and claimed.

An object of the invention is to provide a coupling especially adapted to be used for connecting a hose section with a fire plug or hydrant the parts being so arranged that the act of coupling may be readily effected by presenting the members of the coupling toward each other. The structure is such that the act of uncoupling or disconnecting the members is attended with some difficulty thus preventing accidental disconnection or uncoupling of the members.

With the above object in view the coupling includes a member adapted to be attached to a fire hydrant or plug the said member being provided at the point between its end with an annular shoulder. The coupling also includes a second member adapted to be applied to the fire hose in the usual manner, the said second member having a plurality of spring pressed catches adapted to engage the shoulder upon the first mentioned member whereby the members are held in connection with each other. A lever device is mounted upon the second mentioned member and is provided with means for temporarily locking the catches in engagement with the shoulder whereby accidental disconnection of the coupling members is prevented or attended with a certain amount of difficulty.

In the accompanying drawing:—

Figure 1 is a side elevation of the coupling showing the members coupled together.

Fig. 2 is a similar view showing the positions of the parts when the members are about to be uncoupled.

Fig. 3 is a longitudinal sectional view of the coupling showing the members thereof locked together.

Fig. 4 is a perspective view of the lever used upon the coupling for locking the catches.

Fig. 5 is a perspective view of one of the catches.

The coupling comprises a member 1 which is threaded at one end as at 2 whereby it may be connected with the outlet of a fire plug or hydrant. The said member is provided upon its exterior with lugs 3 to which a spanner wrench may be applied for connecting the said member with the plug or hydrant. The member 1 is further provided upon its exterior with an annular shoulder 4 which is beveled at one edge as at 5. Flanges 6 are mounted upon the shoulder 4 and the said flanges are spaced from each other at their ends forming openings or passages 7.

The coupling also includes a member 8 which is adapted to receive the end portion of the member 1. The member 8 is externally screw threaded at one end whereby it may be connected with a section of fire hose in the usual manner. The said member 8 is provided with outstanding lugs 10 to which a spanner wrench may be applied for connecting the member 8 with the fire hose.

Pintles 11 are mounted upon the member 8 and a yoke shaped lever 12 is pivoted upon the said pintles. The said lever 12 is provided at its ends which receive the said pintles with eccentrics 13 which receive the pintles 11 at one side of their centers. Heads 11' are mounted on the ends of the pintles 11 and may be screw-threaded or otherwise secured thereon. The lever 12 is provided at its intermediate portion with a distortion or lip 14 the object of which will be explained hereinafter. The member 8 is provided in the vicinity of the thread 9 but spaced from the same with a shoulder 15 over which the intermediate portion of the lever 12 may spring and under which it may catch when the members are connected together as hereinafter explained.

Pins 16 are mounted at the opposite sides of the member 8 and catches 17 are provided with slots 18 which receive the said pins 16. Heads 16' are mounted on the ends of the pins 16 and may be screw-threaded or otherwise secured thereon. The catches 17 are further provided with circular openings 19 which receive the eccentrics 13. The catches 17 are provided with hook ends 20 which are adapted to engage against the beveled surface 5 of the shoulder 4 when the members are coupled.

When the members are coupled together they are in the position shown in Figs. 1 and 3 of the drawing wherein it will be seen that the intermediate portions of the catches 17 lie in the passages 7 and the hook ends 20 are in engagement with the shoulder 4. To secure such position of the parts the lever 12 is swung down so that the outer ends of its side portions engage under the shoulders 15 the eccentrics 13 being thus retracted whereby the hook ends 20 are drawn tight against the shoulder 4. It will also be seen that the end of member 1 is received and retained in close contact in the corresponding end of the member 8. When the parts are thus connected, water may flow or be drawn through the said members in the usual manner without leakage. When it is desired to disconnect the members from each other, a pry is inserted under the lip 14 and the outer end portions of the sides of the lever 12 are forced up over the shoulder 15 thus liberating the lever and permitting it to be swung into the position shown in Fig. 2 of the drawing. Prior to this the thumbs or fingers are inserted between the hooks 20 and the sides of the member 1 and the said hooks are swung out against the tension of springs 21 which are inserted between the heads 16' of the pins 16 and the outer sides of the catches 17. Thus the said hooks are disengaged from the shoulder 4 and the turning movement of the eccentrics 13 moves the catches longitudinally whereby the said hooks 20 are drawn below the shoulder 4 and out of engagement with the same. When this has been accomplished the member 8 may be readily slipped from off of the member 1 and thus the parts are disconnected.

From the foregoing description taken in conjunction with the accompanying drawing it will be seen that a hose coupling of simple and durable constructural arrangement is provided and that the parts may be easily and quickly connected together and when connected will be so maintained against accidental separations. Furthermore, by using an implement or the thumb and exercising more or less force to swing the lever, the members of the coupling may be readily disconnected from each other.

Having described the invention, what is claimed is:—

1. A hose coupling comprising a member having a shoulder, a second member adapted to receive the end portion of the first mentioned member, pintles and pins mounted on the second mentioned member, catches having slots which receive the pins whereby the catches may slide on the pins, springs interposed between the pins and the catches, said catches having hook ends adapted to engage the shoulder, a lever fulcrumed upon the pintles and having eccentrics which are received in the catches and a shoulder mounted upon the second mentioned member, said lever adapted to swing into engagement with the shoulder to hold the hooks of the catches in contact with the shoulder upon the first mentioned member.

2. A hose coupling comprising a member having a shoulder, a second member adapted to receive the end portion of the first mentioned member, a flange on the second mentioned member having passages, pintles and pins mounted upon the second mentioned member, catches slidably received in the passages and having slots which slidably receive the pins, springs interposed between the pins and the catches, said catches having hook ends adapted to engage the shoulder, a lever fulcrumed upon the pintles and having eccentrics which are received in the catches and a shoulder mounted upon the second mentioned member, said lever adapted to swing into engagement with the shoulder to hold the hooks of the catches in contact with the shoulder upon the first mentioned member.

In testimony whereof I affix my signature in presence of two witnesses.

PINKNEY A. McSWAIN.

Witnesses:
E. EDMONSTON, Jr.,
BENNETT S. JONES.